July 9, 1946.　　　　　C. R. HOCOTT　　　　　2,403,719
EVAPORATION TOWER FOR COOLING SUSPENSIONS
Filed Feb. 21, 1944

INVENTOR.
Claude R. Hocott
BY
J. D. McKean
ATTORNEY.

Patented July 9, 1946

2,403,719

UNITED STATES PATENT OFFICE 2,403,719

EVAPORATION TOWER FOR COOLING SUSPENSIONS

Claude R. Hocott, Houston, Tex., assignor to Standard Oil Development Company, a corporation of Delaware Application February 21, 1944, Serial No. 523,180

6 Claims. (Cl. 261—1)

The present invention is directed to a tower for cooling thixotropic liquids such as suspensions of finely divided solids in a liquid vehicle.

It is at times necessary or desirable to remove heat at a substantially high rate from thixotropic liquids such as a suspension of finely divided solids in water. This problem may be encountered in the drilling of deep boreholes wherein the lower formations penetrated have relatively high temperatures and wherein it is desirable to maintain the temperature of the drilling fluid being circulated substantially below the temperature of the formations being drilled in order the better to control the viscosity of the drilling fluid. The usual practice of processing the circulating drilling fluid has involved the use of a mud pit for settling out cuttings from the drilling fluid, with mud being taken from the pit and forced by means of a mud pump down through the drill stem and out through the openings of the bit at the bottom of the hole and thence upwardly through the annulus defined by the wall of the hole and the drill stem to return it to the mud pit. In such a system the mud at the surface of the pit is in contact with the atmosphere and undergoes some cooling. However, when penetrating the great depths now possible with modern drilling technique, the cooling of the drilling mud by exposure of the mud in the pit to the atmosphere is not sufficient to maintain the temperature of the mud as low as desired.

It is an object of the present invention to devise a cooling tower suitable for cooling thixotropic or viscous suspensions of the character of drilling fluid.

More specifically, it is an object of the present invention to devise a tower for cooling thixotropic liquids which has splash pieces for dispersing the liquid being cooled which are arranged to be washed by liquid being added to the cooled thixotropic liquid. An additional object of the present invention is the arrangement of a cooling tower in which the splash pieces are mounted on flexible members to allow them to be moved from a zone in which a thixotropic liquid is being cooled, and wherein they serve as a means to break up a stream of the liquid to another zone wherein they are washed by means of makeup liquid, and wherein the movement of the members from one zone to another serves to agitate the thixotropic liquid, which has been subjected to the cooling action of the tower.

Other objects and advantages of the present invention may be seen from a reading of the following description, taken with the drawing, in which.

Figure 1:
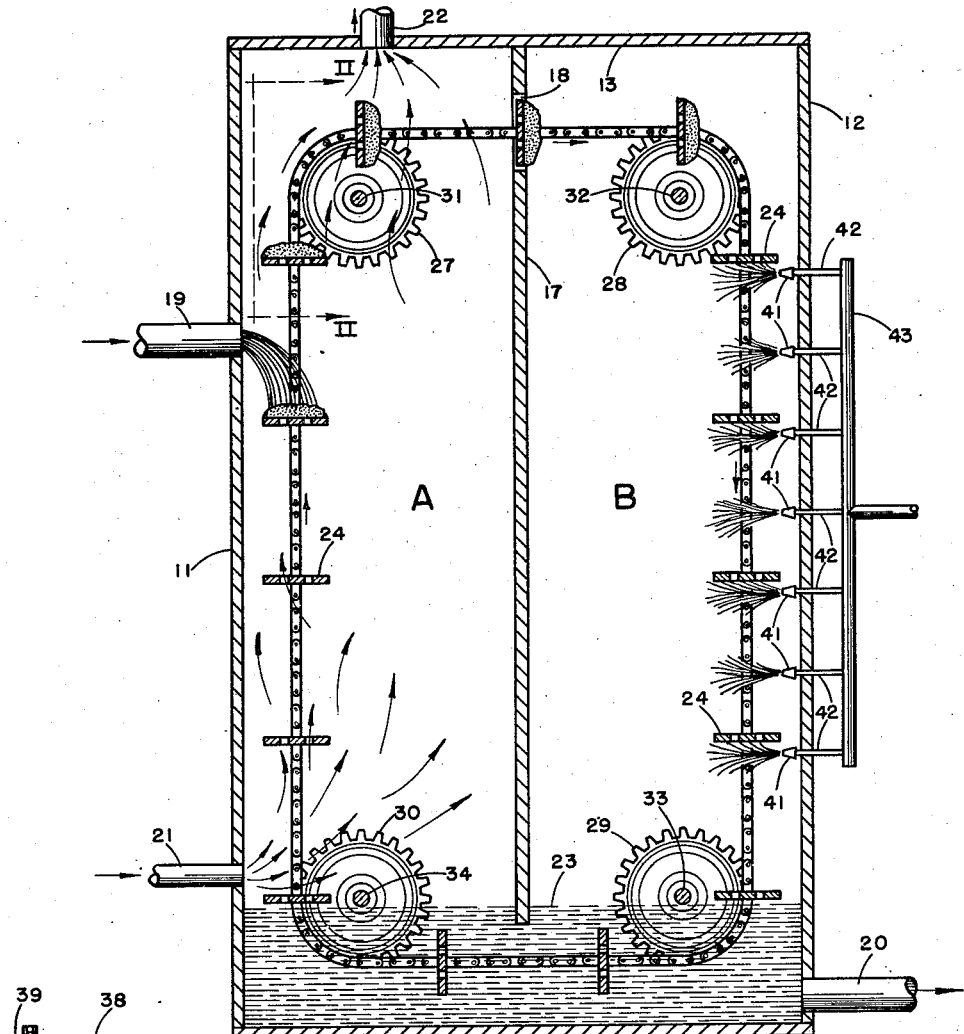
Fig. 1 is an elevation, partly in section, of an embodiment of the present invention.

Turning now specifically to the drawing, a shell for the tower is defined by vertical sides 11 and 12, horizontally extending top 13 and bottom member 14. The ends of the shell are closed in by members 15 and 16, shown in Fig. 2. The tower is divided into two sections or zones, zone A and zone B, of approximately equal volume by means of vertically extending partition 17. It will be seen that the lower end of partition 17 terminates some distance above bottom plate 14, and that near the upper end of partition 17 is a horizontally extending opening 18.

The suspension to be cooled is conducted into the tower by means of inlet 19, extending through wall 11, and an outlet for the cooled suspension is provided by means of conduit 20 extending through a lower portion of wall 12. An inlet means for the cooling gas is provided by conduit 21 extending through wall 11 at a point substantially below inlet 19, and an outlet means for the gas is provided by means of conduit 22 extending through wall 13. It will be seen that the inlet and outlet means for the suspension and for the cooling gas are arranged to allow the suspension to be injected into a zone of the cooling tower as defined by partition 17 and to fall downwardly through this zone under the influence of gravity and to contact the upwardly rising stream of cooling gas in this zone. The suspension falling to the bottom of the cooling tower may be allowed to collect in a pool having its level 23 slightly above the lower edge of partition 17, and may be withdrawn through outlet 20 at such a rate as to maintain level 23 above the lower edge of partition 17. It will be understood that auxiliary equipment will be required to force the suspension through conduit 19 into the tower, to remove it from the tower via outlet 21, and to force the cooling gas, such as air, into the tower via conduit 21. Auxiliary equipment suitable for this purpose is generally known to the art, and for that reason is not shown in the drawing and will not be further described.

Figure 2:
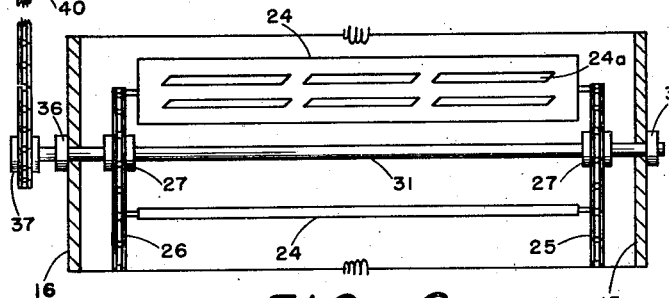
Fig. 2 is a view taken along section II—II of Fig. 1.

Arranged within the tower are horizontally extending members 24, which serve as splash boards to break up the stream of liquid being passed into the tower for cooling. The ends of the splash boards are secured to flexible members arranged to move the splash boards in a cycle from zone A to zone B. The means for mounting pieces 24 are illustrated in Figs. 1 and 2 as including endless chains 25 and 26, with one end of each piece 24 secured to a link of chain 25 and the other end of each piece 24 secured to one link of chain 26. Chains 25 and 26 are supported by pairs of sprockets 27, 28, 29 and 30, these pairs of sprockets being secured to shafts 31, 32, 33 and 34, respectively, for rotation therewith. In Fig. 2 the pair of sprockets 27 is shown mounted on shaft 31 with the ends of the shaft secured to bearings 35 and 36, mounted on sidewalls 15 and 16, respectively, to allow the rotation of the shaft 31. It will be understood that although the mounting means for the remaining shafts are not shown, they are mounted on bearings secured to walls 15 and 16 in a manner corresponding to the mounting of shaft 31.

It will be seen in the drawing that pairs of sprockets 27, 28, 29 and 30 are arranged to define the corners of a rectangle, with endless chains 25 and 26 carried by the pairs of sprockets 27, 28, 29 and 30, and in turn furnishing support for members 24. A means for rotating shaft 31, and in turn pair of sprockets 27 secured thereto, is provided as shown in Fig. 2. This rotating means includes a sprocket 37 fixed to one end of shaft 31 by suitable means, such as a key, not shown, and a prime mover 38 provided with a sprocket 39 and a drive chain 40 transmitting power from sprocket 39 to sprocket 37. Rotation of sprocket 39 by the prime mover drives shaft 31, and this in turn causes the movement of endless chains 25 and 26 and forces the members 24 to move along the rectangle defined by the pairs of sprockets 27, 28, 29 and 30. The members 24 are driven so that they move upwardly countercurrent to the stream of liquid injected into the tower via conduit 19 and also countercurrent to the movement of the pool of liquid collected in the bottom of the tower and moving from a point below the termination of conduit 19 to conduit 20. As a member 24 moves through the tower, the surface presented upwardly to receive the impact of the stream of liquid from conduit 19 assumes a vertical position as the member travels from sprockets 27 to 28 and then faces downwardly as the member moves from sprockets 28 to 29. This change in the position of the members 24 aids in removing thixotropic liquid or solids from the stream of thixotropic liquid which may tend to accumulate on members 24 when they contact the stream of liquid conducted into the tower via conduit 19.

The effect of members 24 as they move upwardly in zone A countercurrent to the stream of liquid to be cooled is similar to that of the splash pieces provided in a conventional water cooling tower. As members 24 move through the tower each member is in effect rotated as it moves through a complete cycle from zone A to zone B and back to zone A, and this movement of members 24 aids in the removal of accumulated solids and viscous liquid under the influence of the force of gravity. An additional means for cleaning members 24 is provided in section B of the tower. In section B a plurality of nozzles 41 are arranged within the tower to project a stream of water in a general horizontal direction. Each nozzle is connected by means of conduit 42 with a larger conduit 43, which may be connected to a liquid reservoir, not shown, and which serves to supply washing fluid to the entire assembly of nozzles. Nozzles 41 are arranged to project streams of liquid substantially parallel with the sides of members 24 as they are moved adjacent the nozzles, these streams washing from members 24 any solids and viscous liquids which may have accumulated thereon in section A.

When the tower of the present invention is used for cooling suspensions of solid in liquid of the character of fluids used for drilling deep boreholes, members 24 have the additional advantage of maintaining the suspension in the bottom of the tower in a substantially uniform condition. This is provided by the movement of the members 24 through the pool of liquid accumulating in the bottom of the tower; members 24 serving, in effect, as a stirring means to maintain the pool agitated. In order to serve as agitating means as well as for splash members in the cooling tower, it is desirable to provide longitudinally extending slots 24a in members 24.

It will often be found that the amount of liquid employed in section B for washing members 24 may be adjusted to equal that removed in section A by the gas employed for cooling the suspension. This is illustrated by the following example wherein a drilling fluid is cooled. An aqueous drilling fluid weighing 75 pounds per cubic foot and at a temperature of 150° F. is to be cooled 20° F. This fluid consists of 30% solids having a specific heat of 0.2 and 70% of water with a specific heat of 1. If the rate of flow is one cubic foot per second, the heat to be removed per second is:

$$75 \times .3 \times .2 \times 20$$
(Heat removed from solids)

$$+$$

$$75 \times .7 \times .1 \times 20$$
(Heat removed from liquid)

The latent heat by vaporization of water at 150° F.=920 B. t. u. per pound.

If it be assumed that all of the cooling is produced by the evaporation of water, the following equation may be used:

Water evaporated per second=
1140÷920=1.24 pounds

This will be the amount of water available per cubic foot of drilling fluid cooled to spray against the splash boards in section B to insure the thorough cleansing of the splash boards.

Figure 3:
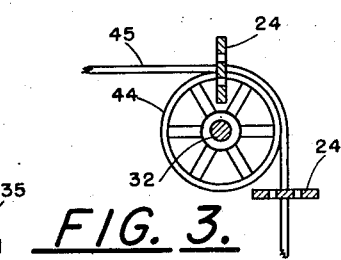
Fig. 3 is a fragmentary view of another embodiment of the present invention.

It will be understood that changes may be made in the device of the present invention without departing from the scope thereof. Such a change may be the substitution of an endless belt for the endless chain used to suspend each end of the splash board, and the substitution of suitable supporting means for such a member. Fig. 3 is a fragmentary view showing a portion of such a driving means corresponding to sprocket 28 of the embodiment of Figs. 1 and 2. In the embodiment of Fig. 3 a pair of pulleys 44 is substituted for the pair of sprockets 28, with the pulleys mounted on shaft 32 in the same manner as was the pair of sprockets 28 in the embodiment of Fig. 1. It will be understood that the pulleys 44 are spaced apart adjacent the ends of shaft 32, although only one of the pulleys can be seen in the side elevation of the drawing. Passing over each pulley 44 is a belt 45 with an end of each splash board 24 attached to each belt. The remainder of this embodiment corresponds to that of Fig. 1 with the exception that a pair of smooth pulleys are substituted for the sprockets of the embodiment of Fig. 1 and the pair of belts 45 is substituted for the pair of chains 25, 26 shown in Figs. 1 and 2.

It will be appreciated that other changes may be made in the device described without departing from the scope of the present invention, and it is my intention to embrace such changes by the hereto appended claims.

I claim:

1. Means for cooling a liquid comprising, in combination, a shell, a vertical partition within said shell cooperating with the shell to divide it into a first and a second zone with communication between the zones provided only by a first laterally extending opening adjacent the upper end of the shell and a second laterally extending opening adjacent the lower end of the shell, a first discharge means arranged to discharge liquid into the first zone at a substantial distance above the lower portion of the shell, a second inlet means arranged to discharge cooling gas into the first zone at a point substantially below the first inlet and above said laterally extending opening, a first outlet arranged adjacent the lower portion of the shell for removing liquid from the second zone, a second outlet arranged to remove gas from the upper portion of the first zone, splash pieces arranged to be moved through both zones comprising laterally spaced members, endless flexible means attached to one end of each of the laterally extending members, an upper and a lower pair of circular members arranged in each zone for rotary movement with one of each pair supporting one of the flexible members, said circular members being arranged to move the laterally extending members through said second laterally extending opening vertically upwardly in the first zone, through said first laterally extending opening and vertically downwardly in the second zone, and means arranged for discharging washing liquid on the laterally extending members as they move through the second zone.

2. An evaporation tower comprising, in combination, a member defining a shell, a vertical partition arranged within the member to cooperate with the shell to divide it into a first zone and a second zone with communication between the zones provided only by a first laterally extending opening adjacent the upper end of the shell and a second laterally extending opening adjacent the lower end of the shell, splash pieces, mounting means arranged in the shell for moving the splash pieces through said laterally extending openings from one zone to the other zone, an inlet connected to the shell adapted to discharge a viscous liquid into the first zone a substantial distance above the lower portion thereof and in contact with the splash pieces as they move through the zone, an outlet arranged to remove liquid from a lower portion of the second zone, means arranged for discharging liquid against the splash pieces as they move through the second zone, a second inlet arranged for discharging cooling gas into the shell at a point adjacent the lower portion of the first zone and above said second laterally extending opening, and a second outlet arranged for removing gas from an upper portion of the first zone.

3. An evaporation tower comprising a member defining a shell having at least two substantially vertical parallel sides and a substantially plane bottom perpendicular to said sides, two spaced endless flexible members of equal length in said shell, mounting means supporting each flexible member arranged to allow movement of said member with portions of said members adjacent and parallel to said sides and said bottom member, driving means arranged for moving said flexible members at equal speed, a plurality of elongated members laterally arranged in the shell with one end of each member secured to one flexible means and the other end thereof to the other flexible means, a solid partition arranged in said shell substantially parallel with said parallel sides to divide the shell into a first zone and a second zone and provided with a laterally extending opening near its upper end and at its lower end to allow passage of the flexible members carrying the laterally extending members, a first inlet means adopted to discharge liquid into said first zone to cascade against the lateral members, a second inlet means adapted to discharge gas into said first zone at a point below said first inlet means and above the lower laterally extending opening of said partition, a first outlet means arranged for removing gas from the upper portion of said first zone, a second outlet means arranged for removing liquid from a lower portion of said second zone and means arranged for discharging washing liquid against the lateral members as they pass through by said second zone.

4. A device in accordance with claim 3 in which said flexible members are chains.

5. A device in accordance with claim 3 in which said flexible members are belts.

6. An evaporation tower comprising, in combination, substantially vertically and horizontally extending planes defining an enclosed shell, parallel laterally extending shafts extending from one side to the opposite side of said shell with the ends of said shafts secured to the sides of said shell to allow rotation of said shafts, a pair of spaced sprockets mounted on each shaft, a pair of endless chains mounted on said spaced sprockets, laterally extending members arranged in said shell with one end of each member secured to each of said chains, a prime mover arranged to rotate one of said shafts, a solid partition arranged in said shell parallel with said shafts to divide said shell into a first and a second zone of approximately equal volume and having a first laterally extending opening at its upper and a second laterally extending opening at its lower end to allow the passage of said chains and the members carried by said chains, a first inlet means connected to said shell and arranged to discharge liquid into an upper portion of the first zone for cascading against said laterally extending members, a second inlet means arranged to discharge gas into said shell within said first zone at a point below the first inlet means and above said second laterally extending opening, a first discharge means arranged for withdrawing gas from the first zone at a point above the first inlet means, a second discharge means arranged for withdrawing liquid from a lower portion of the second zone of said shell and means arranged for discharging a plurality of horizontally directed streams of liquid against said laterally extending members in the second zone.

CLAUDE R. HOCOTT.